Figure 1:
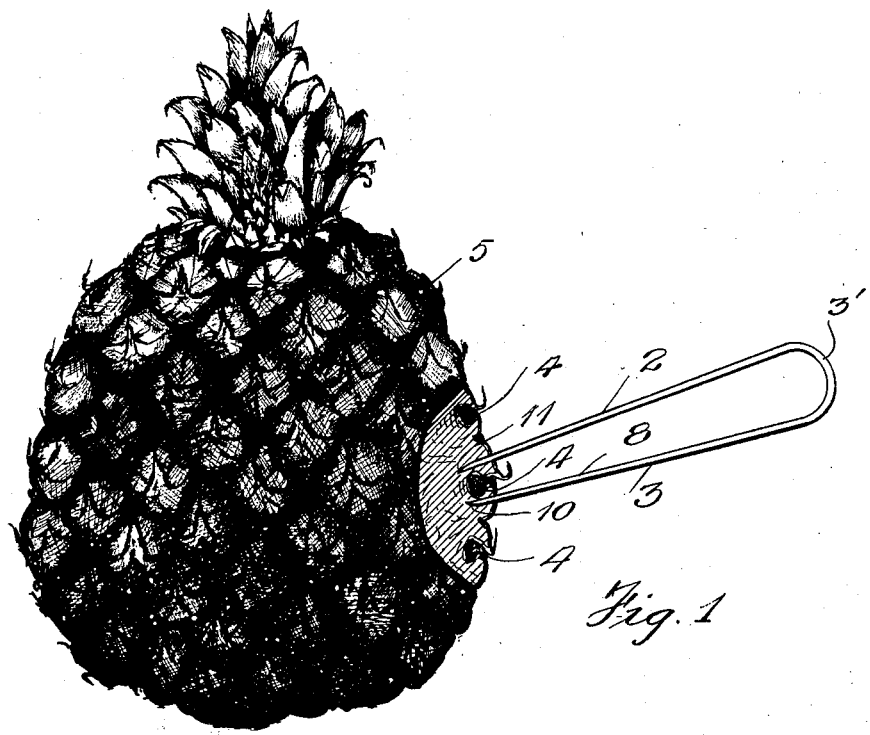

J. S. GRENN.
KITCHEN UTENSIL.
APPLICATION FILED FEB. 24, 1908.

925,695.

Patented June 22, 1909.

UNITED STATES PATENT OFFICE.

JOHN SAMUEL GRENN, OF CHICAGO, ILLINOIS.

KITCHEN UTENSIL.

No. 925,695.　　　　　Specification of Letters Patent.　　　Patented June 22, 1909.

Application filed February 24, 1908. Serial No. 417,224.

*To all whom it may concern:*

Be it known that I, JOHN S. GRENN, a citizen of the United States, residing at Chicago, in the county of Cook and State of Illinois, have invented certain new and useful Improvements in Kitchen Utensils, of which the following is a specification.

My invention relates to kitchen utensils and has particular reference to a device for cutting out pineapple cores and then seizing and pulling out the core after an incision has been made around it, and the invention consists in the construction hereinafter described, illustrated in the drawing and claimed in the appended claim.

Figure 2:
Figure 3:
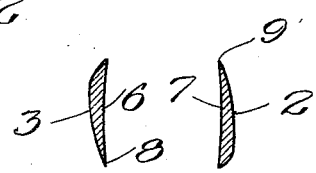

In the drawing—Figure 1 is a view of a pineapple and an edge view of the corer in position preparatory to cutting out one of the cores. Fig. 2 is a side view of the corer. Fig. 3 is an enlarged section taken on line X—X of Fig. 2. So far as I am aware no simple, and at the same time thoroughly efficient corer has heretofore been produced for cutting out pineapple eyes on account of the depth of the latter and the tenacity with which they adhere to the body of the fruit. I have overcome the difficulty heretofore experienced with coring this kind of fruit by providing a fruit eye remover consisting of a pair of thin, elongated blades 2 and 3 joined by a spring-base 3', whereby the blades are normally held their maximum distance apart and may be adjusted toward each other to adapt them to cores 4 of different cross sections, in a pineapple 5. As shown in Fig. 3 the blades 2 and 3 are slightly concaved in their adjacent faces, as at 6 and 7. The blades have oppositely disposed knife-edges 8 and 9 and inwardly tapered tips 10 and 11, as shown in Fig. 1, which bring the tips of the blades to a sharp edge in each instance. The latter edges facilitate easy insertion of the blades on opposite sides of a core and after the blades have been inserted to the depth of the eye or core by rotating the tool around the eye or core the sharp edges 8 and 9 cut the eye or core loose circumferentially. By then pressing the blades together upon the eye or core the latter will be firmly seized so that the operator can tear it loose at its inner end and conveniently remove it, all of which is accomplished with substantially a single movement and with great rapidity. The peculiar shape of each of the blades also adapts it as an oyster shell opener, while the tweezer feature of the utensil adapts it for many kitchen utilities which are beyond the capacities of other forms of devices for this purpose.

Having thus described my invention, I claim as new and desire to secure by Letters Patent—

An eye cutter consisting of a pair of tweezer-like blades, each of said blades having an edged tip and one cutting edge extending longitudinally of the blade, the cutting edge of one of the blades being placed on the opposite side to the cutting edge of the companion blade, substantially as described.

In testimony whereof I have hereunto set my hand in the presence of two subscribing witnesses.

JOHN SAMUEL GRENN.

Witnesses:
M. C. ALLEN,
J. W. BECHSTROM.